(12) United States Patent
Ng et al.

(10) Patent No.: US 7,672,378 B2
(45) Date of Patent: Mar. 2, 2010

(54) SPATIO-TEMPORAL GRAPH-SEGMENTATION ENCODING FOR MULTIPLE VIDEO STREAMS

(75) Inventors: Kim Chai Ng, San Diego, CA (US); Clifford M. Stein, San Diego, CA (US); Huisheng Wang, Los Angeles, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1442 days.

(21) Appl. No.: 11/040,658

(22) Filed: Jan. 21, 2005

(65) Prior Publication Data

US 2006/0165169 A1    Jul. 27, 2006

(51) Int. Cl.
*H04N 7/18* (2006.01)
(52) U.S. Cl. ............. 375/240.26; 348/36; 348/39
(58) Field of Classification Search ......... 375/240.01–240.29; 348/36–39, 42–61, 143–160
See application file for complete search history.

(56) References Cited

U.S. PATENT DOCUMENTS 7,260,261 B2 *  8/2007  Xie et al. .............. 382/173
7,324,594 B2 *  1/2008  Lamboray et al. ...... 375/240.03

OTHER PUBLICATIONS

Siegel, Mel et al., "Compression and Interpolation of 3D-Stereoscopic and Multi-View Video," The Robotics Institute, Carnegie Mellon University, Pittsburgh, PA 15213, David Sarnoff Research Center, Princeton, NJ 08543, Intel Corporation, Hillsboro, OR 97124, Feb. 1997.

* cited by examiner

*Primary Examiner*—Andy S Rao
(74) *Attorney, Agent, or Firm*—Fleit Gibbons Gutman Bongini & Bianco P.L.; Lisa K. Jorgenson

(57) ABSTRACT

A multiple video stream capture and encoding apparatus produces compressed data that represents multiple video streams capturing a common scene. Images from multiple video streams are analyzed to identify image color segments that are encoded into a composite graph data structure. Corresponding image segments across the multiple video streams are also identified and represented by one node in the composite graph data structure. The composite graph data structure also includes links between pairs of nodes that describe the relationship between the image segments associated with those nodes. The composite graph data structure is updated to represent changes to the image segments in the multiple video streams over time. The composite graph data structure is used to create compressed encoded data for storage and/or transmission.

22 Claims, 8 Drawing Sheets

SPATIO-TEMPORAL GRAPH-SEGMENTATION ENCODING FOR MULTIPLE VIDEO STREAMS

FIELD OF THE INVENTION

The present invention generally relates to video stream encoding and more particularly to encoding of multiple video streams that capture part of a common image.

BACKGROUND OF THE INVENTION

Video compression is a sub-field of general data compression, and it is built on top of image compression. Video compression can be further classified into two types: Single Video Stream Compression (SVSC) and Multiple Video Streams Compression (MVSC). Multiple video streams are used to create three dimensional or selectable perspective video presentations and are used in areas such as entertainment (e.g., virtual reality games and 3D movies), education, training, multimedia presentations, communication, surveillance, televiewing with exploration, and so forth.

Raw video contains an immense amount of data. For example, a two dimensional, single HDTV raw video stream signal of 1920×1080 pixels/frame and progressive scanning at 30 frames/s contains:

$$\left( \frac{1920 \times 1080 \text{ pixels}}{\text{frame}} \cdot \frac{30 \text{ frames}}{\text{sec}} \cdot \frac{3 \text{ colors}}{\text{pixel}} \cdot \frac{8 \text{ bits}}{\text{color}} \right) \approx 1.5 \text{ Gb/s}$$

However, an HDTV channel's bandwidth is only 20 Mb/s, requiring compression by a factor of approximately 75 or, equivalently, to a data rate of 0.32 bits/pixel. To achieve even lower data rate video communications, very high compression ratios are used in applications such as videophones, mobile multimedia communications, and remote sensing. Naturally, the transmission and storage of multiple raw video streams require a correspondingly increased amount of resources. Since communication and storage resources are limited and expensive, transmitting and storing raw multiple video streams is usually impractical and/or too expensive for most applications.

Therefore a need exists to overcome the problems with the prior art as discussed above.

SUMMARY OF THE INVENTION

In accordance with one embodiment of the present invention, a method for encoding multiple view video streams includes identifying a first plurality of identified image segments within a first plurality of images. The first plurality of images having been captured at substantially a first time and capturing a first at least partially common view of a first scene. At least two of the images within the first plurality of images each including at least one first set of corresponding image segments. The method further includes creating a first graph data structure that has a first plurality of nodes with each of the nodes in the first plurality of nodes being associated with a respective set of corresponding image segments within the at least one first set of corresponding image segments. The method also includes specifying at least one link between two of the nodes within the first graph data structure based upon a relationship between the two identified image segments that are associated with the two nodes within the first graph data structure.

In accordance with another embodiment of the present invention, a multiple video stream capture and encoding apparatus includes at least one segment analyzer that identifies a first plurality of identified image segments within a first plurality of images. The first plurality of images having been captured at substantially a first time and capturing a first at least partially common view of a first scene. At least two of the images within the first plurality of images each comprising at least one first set of corresponding image segments. The multiple video stream capture and encoding apparatus further includes a composite graph generator that creates a first graph data structure that has a first plurality of nodes with each of the nodes being associated with a respective set of corresponding image segments within the at least one first set of corresponding image segments. The composite graph generator also specifies at least one link between two of the nodes within the first graph data structure based upon a relationship between the two identified image segments that are associated with the two nodes within the first graph data structure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

As required, detailed embodiments of the present invention are disclosed herein; however, it is to be understood that the disclosed embodiments are merely exemplary of the invention, which can be embodied in various forms as described in the non-limiting exemplary embodiments. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
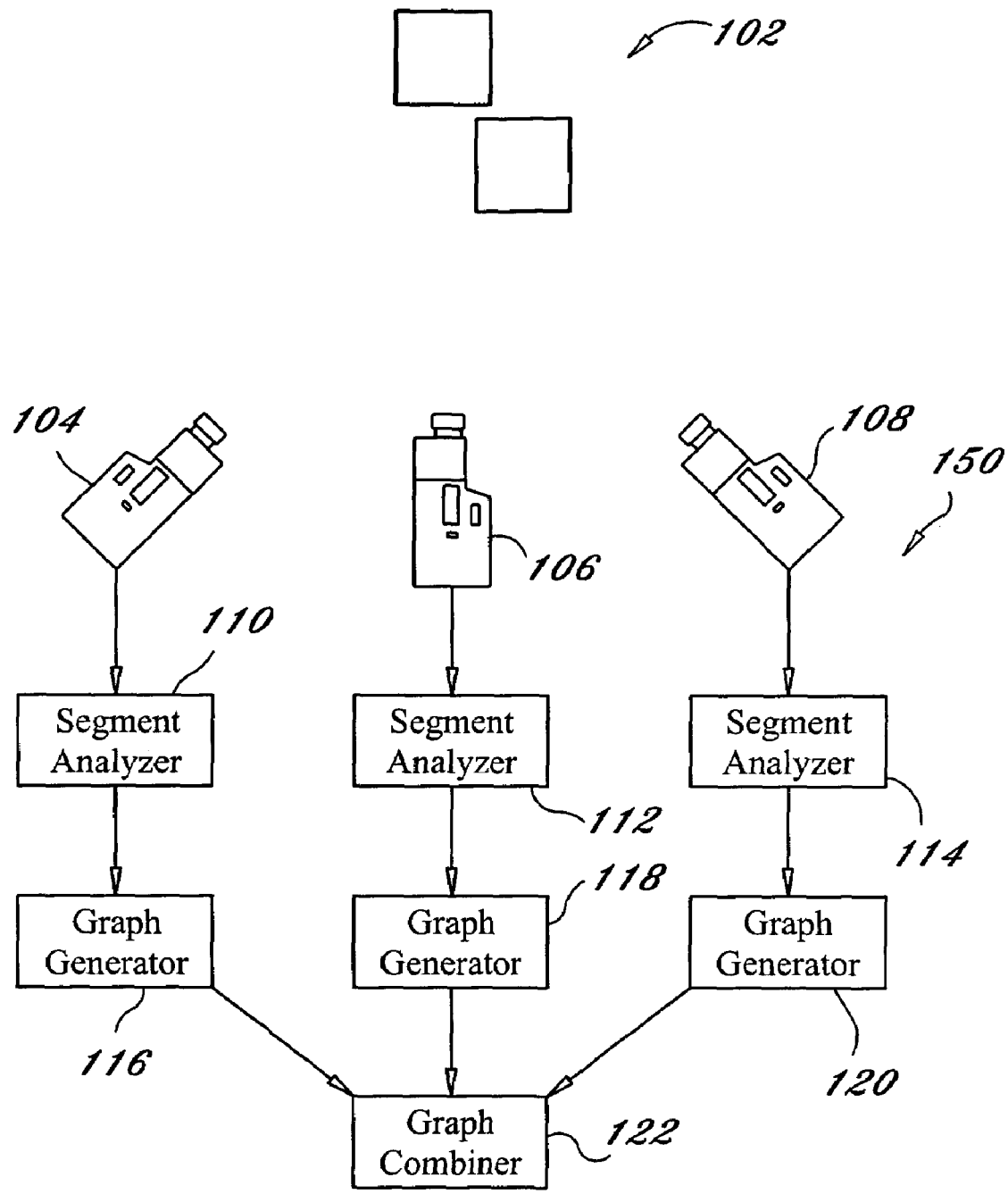
FIG. 1 illustrates a multiple video stream capture apparatus in accordance with an exemplary embodiment of the present invention.

FIG. 1 illustrates a multiple video stream capture and encoding apparatus 150 in accordance with an exemplary embodiment of the present invention. In the exemplary embodiment, three video streams of scene 102 are captured by a first video camera 104, a second video camera 106, and a third video camera 108. Further embodiments of the present invention operate with one or more video cameras. A single video camera embodiment is able to capture different views of a scene 102 by physical movement of the camera or by optical routing through mirrors, prisms, or any other mechanism. Embodiments of the present invention are able to operate with any number of cameras or any other type of image capturing devices.

The images captured by these multiple video cameras are captured at substantially the same time, which can include relatively long time dispersion between captured images for some types of scenes. Images of scenes that change slowly, for example are able to be captured from different video cameras with relatively long time periods between image capture by any two cameras. Although there is a long time period between the image capture for a slowly changing scene, those images are still considered to be captured at substantially the same time. Although the images captured by the video cameras in this exemplary embodiment include the scene 102, the different perspectives of these video cameras capture images that can contain portions that are not also captured by other video cameras. The scene elements that are captured by two or more video cameras are referred to as a common view of the scene or at least a partially common view of the scene.

The video streams produced by each camera are provided to a respective segment analyzer. In the exemplary embodiment, the video stream captured and produced by the first camera 104 is provided to a first segment analyzer 110, the video stream captured and produced by the second camera 106 is provided to a second segment analyzer 112 and the video stream captured and produced by the third camera 108 is provided to a third segment analyzer 114. The segment analyzers process image frames in the captured video stream they receive and identify image segments. Identified image segments in this context are homogeneous regions with either a uniform color or a slowly varying color gradient. Identified image segment data is then communicated from each segment analyzer to a graph generator. The first segment analyzer 110 provides segment information for the video stream generated by the first video camera 104 to the first graph generator 116, the second segment analyzer 112 provides segment information for the video stream generated by the second video camera 106 to a second graph generator 118 and the third segment analyzer 114 provides segment information for the video stream generated by the third video camera 108 to a third graph generator 120. Although individual segment analyzers and graph generators are illustrated for the exemplary embodiment, further embodiments of the present invention divide the above described processing differently, such as by using shared segment analyzer processors and/or graph generators, or by distributing one or more of these functions among multiple processors.

The graph generators identify and characterize "objects" in their respective video streams and then create graph data structures that encode and represent identified image segments and objects in their respective video streams. An "object" is two or more image segments that have an identified spatial relationship. These identified image segments that make up an object in one or more video streams captured by the video cameras are conceptually attached to each other and generally move as a whole, although each image segment in an object is able to have its own independent motion. In other words, there is a link that can be thought of as connecting each segment within an object to the other segments in that object if there is no occlusion in the particular view.

The exemplary embodiment of the present invention uses image segments as a fundamental information unit for correspondence matching of image segments between and among video streams and also for compressing video information. Image segments are used in the exemplary embodiment in order to conserve processing requirements relative to the computational demands of extracting and understanding objects within multiple video streams. Further embodiments of the present invention process objects for correspondence matching and for compressing video information.

The exemplary embodiment of the present invention does, however, observe groups of segments within the multiple video streams through time. The identified image segments within the multiple video streams captured by the exemplary embodiment are stored in a graph data structure, as described in detail below. An object is identified when a group of segments maintain their relationships within the graph data structure, and thus maintain the physical structural relationship for those image segments, over time. This identification in the exemplary embodiment is performed in conjunction with a node-by-node comparison to test for similarity of movements. The exemplary embodiment further classifies multiple nodes in different frames of the multiple video streams as an object if those multiple nodes have the same segment links and connectivity within the graph data structure, as is described below.

When an object is identified and processed as an object, the update in the description of the object in the encoded video stream data requires fewer parameters than are required in the descriptions of all of the individual image segments that constitute that object. This reduction in update parameters directly translates into a higher compression ratio. Consequently, embodiments of the present invention are able to freely select from the range of processing resources to be used by determining the thoroughness of object identification to be performed. Embodiments of the present invention are able to identify up to complete object descriptions, identify and process only image segments, or any level of object identification and processing in between these two extremes.

The outputs of the graph generators of the exemplary embodiment are then provided to a graph combiner 122. The graph combiner 122 generates a composite graph data structure that efficiently stores encoded image segment attributes and relationships for all video streams captured by the multiple video cameras of the exemplary embodiment. An encoded, multiple view video data stream that represents the multiple video stream captured by the multiple cameras is then produced by the graph combiner 122. This encoded, multiple view video data stream is able to be efficiently stored and/or communicated by various means.

Figure 2:
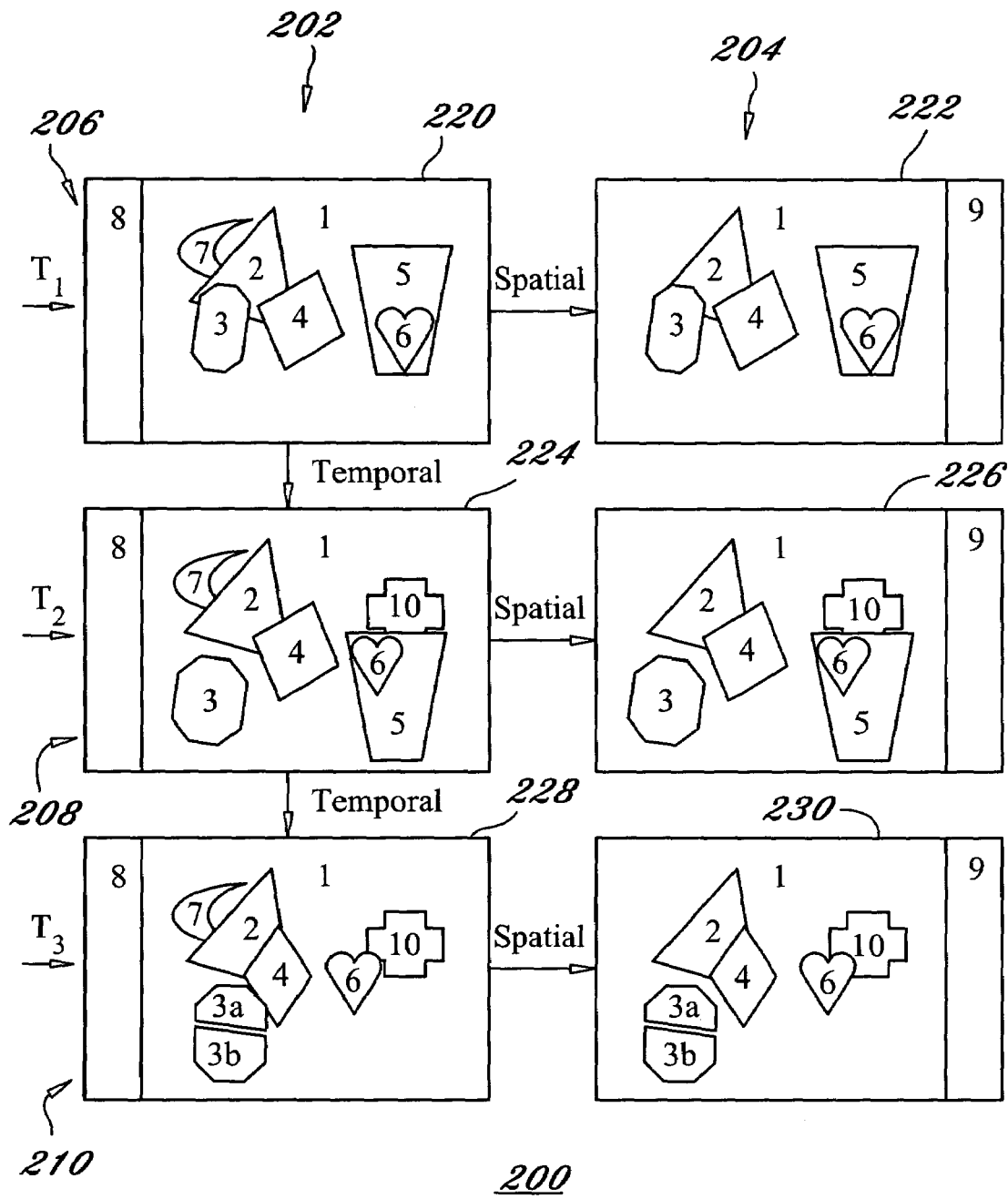
FIG. 2 illustrates multiple view video frames as are processed by the exemplary embodiment of the present invention.

FIG. 2 illustrates multiple view video frames 200 as are processed by the exemplary embodiment of the present invention. The multiple view video frames 200 illustrates images captured at three discrete time points by two video cameras, such as the first video camera 104 and the second video camera 106. In order to simplify and more clearly describe the operation of the exemplary embodiment, this illustration and the following discussion describe the processing of two video streams. However, the processing described herein is applicable to any number of video streams.

The multiple view video frames 200 illustrate a first video stream 202 and a second video stream 204. The first video stream 202 is captured by, for example, the first camera 104 and the second video stream 204 is captured by, for example, the second camera 106. The multiple view video frames 200 shows three image frames for the first video stream 202. A T1 first image 220 is captured at a time T1 206, a T2 first image 224 is captured at a time T2 208, and a T3 first video image 228 is captured at a time T3 210. The second video stream 204 similarly has three images captured at substantially the same times at which the first images were captured. The second video includes a T1 second image 222 that is captured at substantially time T1 206, a T2 second image 226 that is captured at substantially time T2 208, and a T3 second video image 230 that is captured at substantially time T3 210.

Each image in the multiple view video frames 200 shows a number of segments. These segments are characterized by their color characteristics. Areas of each image frame that have the same color or have a slowly changing color gradient are characterized as segments in the exemplary embodiment. The exemplary embodiment identifies image segments as image portions that have a color attribute that is between a first color attribute threshold and a second color attribute threshold. The color attributes used in the exemplary embodiment include chrominance and luminance. Color attributes with the same value are also considered to be between a first color attribute threshold and a second color attribute threshold. The exemplary embodiment identifies and further quantizes these segments as is described below, but the actual areas of similar color are illustrated in this figure to provide a more easily understood description.

The identified image segments in this figure are identified by the numbers "1" through "10." These numerals are not part of the actual captured images, but are indicators to identify the separate identified image segments. For example, the T1 first image 220 includes segments identified as segment "1" through segment "8" and the T1 second image 222 includes segments identified as segment "1" through segment "6" and segment "9." Image segments identified with the same number in this figure have been determined to be corresponding image segments between the two captured images. Each image of a scene, which corresponds to an at least partially common view of the scene, is able to capture a particular object in the scene if that object is within the captured view and not obscured. Each image that captures a particular object will have an image segment that represents that object. The multiple image segments in each of the captured images that correspond to a common object form a set of corresponding image segments. This results in at least some of the multiple captured images including corresponding image segments. Corresponding image segments are identified in the exemplary embodiment by the color, shape, size, links (connectivity) within the graph data structure, relative positions to other segments, and temporal motion within a sequence of the segments.

In the images of this example, the segment labeled segment "1" is a background segment that has a color gradient. Segment "8" and segment "9" in this example are image segments that do not overlap between the T1 first image 220 and the T1 second image 222, but are segments that are each only visible in their respective video images, such as due to occlusion or by being out of the field of view of the camera capturing the other video stream. Segment "7" in this example is seen within the images of the first video stream 202 but is occluded from images of the second video stream 204. This occlusion prevents segment "7" from being seen in the second video stream 204, even through the spatial location of segment "7" is actually within the field of view of the second video camera.

In this example, it is assumed that each segment represents an object. Segments in video streams are not required to be associated with objects, but might be, for example, merely colored areas of a larger object. In the video streams of this example, segment "1," segment "2," segment "7," and segment "10" appear to be static objects for the time durations encompassing time T1 206, time T2 208 and time T3 210. Segment "3," segment "4," segment "5," and segment "6" are dynamic objects that move between the times at which images are captured at time T1 206, time T2 208 and time T3 210. The motion of the segments as observed between images captured at different times, as well as segment differences between images captured at the same time but from different perspectives, is able to be one or both of translational and/or rotational.

In both the first video stream 202 and the second video stream 204 of the example multiple view video frames 200, the segment "10" is seen to be uncovered and to appear into the scene as segment "5" moves downward between time T1 206 and time T2 208. In the multiple view video frames 200, segment "5" then continues to move out of the views of both cameras at time T3 210. Image segments in the different captured images can also deform relative to images captured at different times and/or from different perspectives. Such deformations include changes in the scale and shape of segments in different captured images, as is illustrated by segment "3," segment "4," and segment "6" that are illustrated in the different images of the multiple view video frames 200 with different scales and/or shapes.

A further change that segments can undergo between images is observed as a splitting of a segment. Segment splitting is illustrated in the multiple view video frames 200 by segment "3," which splits into two segments, segment "3a" and segment "3b," between time T2 208 and time T3 210. Segment splitting can be caused, for example, by an identified image segment, such as segment "3," that actually contains two independently moving objects with identical or substantially similar colors. Another example of segment splitting results from an occlusion caused by other segments moving in front of the segment that appears to split. The exemplary embodiment is able to identify splits caused by occlusions by observing that the segments of the split object have the same motion. Identifying split segments is advantageous because, for example, if a first segment is split by a second segment, which lies on top of the first segment, the first segment is able to be more efficiently encoded as a single segment instead of multiple segments, e.g., two separate segments. Encoding such segments as a single, but split, segment supports better temporal compression.

Figure 3:
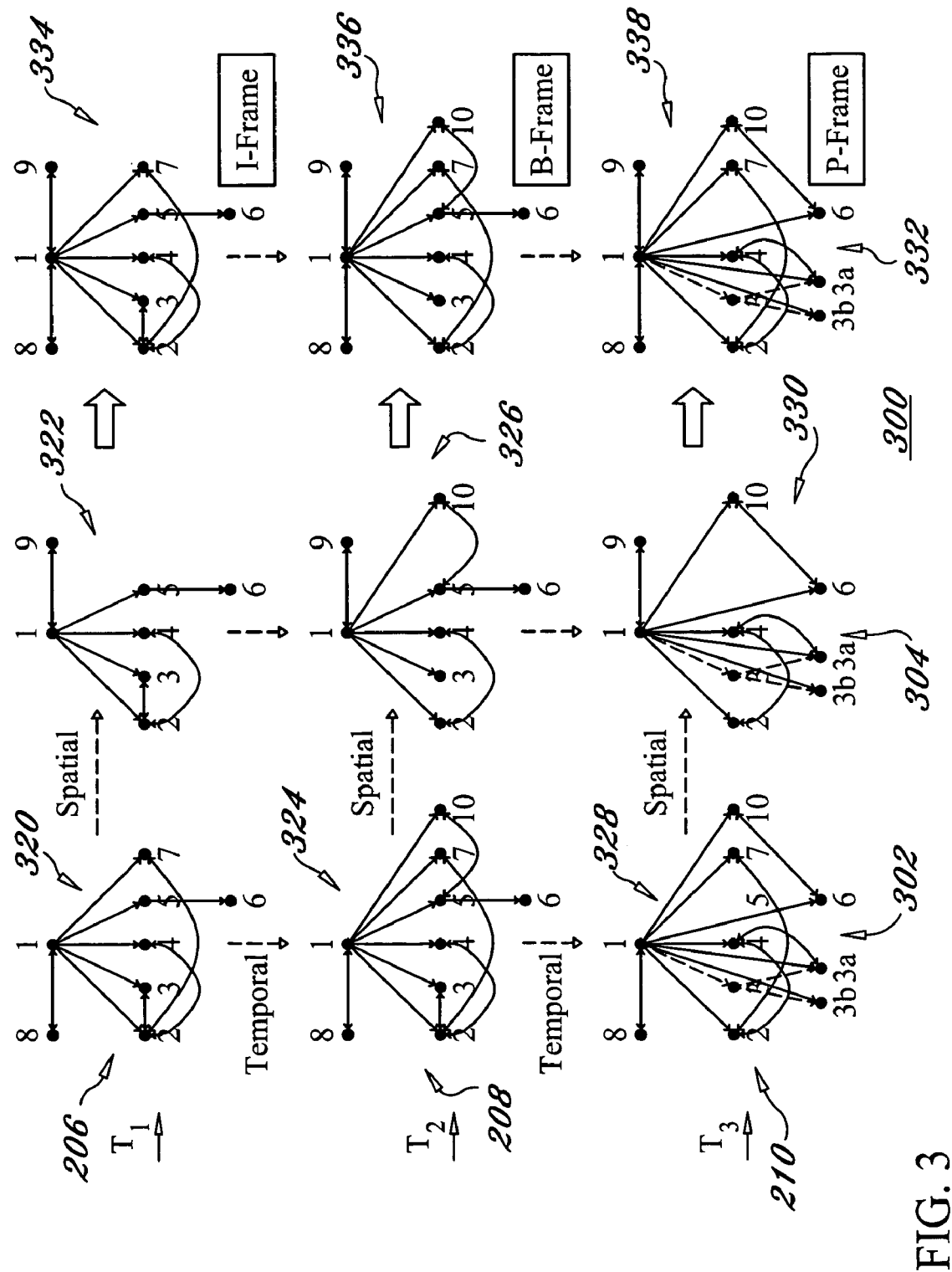
FIG. 3 illustrates graph data structures that represent the image data of multiple video streams in accordance with the exemplary embodiment of the present invention.

FIG. 3 illustrates graph data structures 300 that represent the image data of the multiple video streams 200 in accordance with the exemplary embodiment of the present invention. The exemplary graph data structures 300 demonstrate the construction of graph data structures that describe multiple video frames captured at different times and that each include multiple image segments. In this example, a separate graph data structure is illustrated for each captured image of both the first video stream 202 and the second video stream 204 of the multiple video streams 200. For example, the images captured at the first time T1 206, (i.e., the T1 first image 220 and the T1 second image 222) have corresponding graph data structures: the T1 first graph data structure 320 and the T1 second graph data structure 322, respectively. Similar graph data structures represent the images captured for these two video streams at the other illustrated times: at time T2 208 and at time T3 210. The second video graph data structures 304, (i.e., the T1 second graph data structure 322, the T2 second graph data structure 326, and the T3 second graph data structure 330) similarly store image segment information.

Composite graph data structures 332, such as I-frame composite graph data structure 334, B-frame composite graph data structure 336, and P-frame composite graph data structure 338 are generated from the first graph data structures 302 and the second graph data structures 304. Composite data graphs are illustrated for time T1 206, time T2 208 and time T3 210. The composite graph data structures 332 of this example are spatial-temporal graph data structures that represent, for example, the image information contained in both the first graph data structures 302 and the second graph data structures 304.

In the exemplary graph data structures 300, each image segment is represented as a node of one or more graph data structures. This representation is indicated by each node having the number that corresponds to its associated image segment. When one image segment in an image is connected to another image segment in the image by bordering with or by partially overlapping that other segment, that connection is represented as a bidirectional arrow between the two nodes in the graph data structure that represent those two segments. When one segment is completely contained within another segment in an image, that connection between those two segments is represented by a unidirectional arrow between the two nodes in the graph data structure that represent those two segments so that the arrow points to the segment that is contained within the other segment. In the example of the multiple video streams 200, all identified image segments, except segment "8" and segment "9," are completely contained within background segment "1." In the example of T1 first graph data structure 320, all nodes except node "6," node "8," and node "9," are represented as directly contained within segment "1" as indicated by a unidirectional arrow from node "1" to these other nodes. Node "6" is also similarly represented as contained within node "5." The T1 first graph data structure 320, which corresponds to T1 first image 220, represents this relationship by having all nodes, except node "6," node "8," and node "9," connected to node "1" by lines that start at node "1" and have unidirectional arrows connecting to each of node "2" through node "5" and node "7."

Segment "6" in the T1 first image 220 illustrates a case of multiple segments being contained within other image segments in a hierarchical structure. In this example of the T1 first image 220, segment "6" is completely contained within segment "5" and segment "5" is, in turn, completely contained within segment "1." In the T1 first graph data structure 320, node "6" is similarly indicated as being contained within node "5" and node "5" is indicated as being contained within node "1." This relationship is illustrated in the graph data structures that correspond to time T1 206 and time T2 208 that show unidirectional arrows between node "1" and node "5" and further between node "5" and node "6." As shown in the T1 first graph data structure 320, there is not a direct link between segment "6" and segment "1," although this relationship is preserved via the connection through node "5." This representation reduces the amount of data that is needed to describe the relationship of node "1" to node "6" by representing the connection as going through node "5." In other words, node "1" is the parent of node "5," and node "5" is the parent of node "6."

In the third temporal frame, for example in the T3 first graph data structure 328, node "6" is represented as connected directly to node "1" when node "5" moves out of view in the third temporal frame, as illustrated in T3 first image 228. In the third temporal frame, for example in the T3 first image 228, node "3" has split into two nodes: a node "3a" and a node "3b." Node "3a" is bidirectionally connected to node "4" in the T3 first graph data structure 328 to represent that segment "3a" in the T3 first image 228 partially overlaps segment "4." The splitting process of node "3" is represented with a dot-dash unidirectional link from node "1" to node "3," and by a further dot-dash unidirectional link from node "3" to both node "3a" and node "3b." This splitting representation mechanism for the graph data structures facilitates the description of transitional motion vectors to the splitting nodes. Node "3a" is bidirectionally connected to node "4" in the T3 first graph data structure 328 to represent that segment "3a" in the T3 first image 228 partially overlaps segment "4."

The graph data structures that correspond to the first video stream 202 and the second video stream 204, i.e., the first graph data structure 302 and second graph data structure 304, are merged into a spatial-temporal composite graph data structure 332. In the example of the graph data structures that reflect changes between time T1 206 and time T2 208, the motion of segment "3" and segment "5" uncover segment "2." This uncovering of segment "2" is reflected by deleting links between these two segments and segment "2." A further change in the images between time T1 206 and time T2 208 is that a new segment "10" appears, either by being uncovered or moving from outside of the image. This new segment is represented by inserting a corresponding node into the graph data structure. It is to be noted, however, that segment "5" still covers part of new segment "10," and this relationship is reflected by inserting a link between these two nodes. In the images of time T3 210, the continuous motion of segment "5" shows that this segment leaves the camera views, which is reflected by deleting the node associated with segment "5." Further, at time T3 210, segment "6" has moved to partially cover segment "10," which is represented by insertion of a link between these two nodes. The movement of segment "5" has also caused segment "6" to now be a direct child of segment "1" in the image at time T3 210, which is represented as inserting a link between these two nodes. When a new segment moves into the scene, it brings in an inserted node and link into the graph data structure. The splitting of an existing segment, as was observed with segment "3" at time T3 210, results in splitting the corresponding node of the graph data structure, such as with segment "3a" and segment "3b," and providing corresponding links in the graph data structure. The graph data structures at time T3 further illustrate that as split segment "3a" covers part of segment "4," a bidirectional link is added between these two nodes. It is to be noted that splitting links are also used in the case of an image segment that corresponds to multiple segments, although those segments are not necessarily split from a contiguous segment.

The graph data structures discussed above describe the structural relationships of objects within the scene. For video streams of the same scene, structural relationships usually do not change drastically between different images, especially in closely-spaced temporal image frames usually captured for video streams. Changes in individual image segments generally include change in position, shape, size, and even subtle color changes. Subtle color changes are often caused by noise, luminance, and reflection. However, the scene structure, and thus graph structure, generally maintains a quite similar structure that is sufficient for motion/disparity estimation and therefore for video compression. Robust and stable motion/disparity estimation with regard to changes in image segment position, shape, size, and color generally results in an ability to achieve high video compression ratios and high video quality.

In the exemplary graph data structures 300, the graph data structures of the first graph data structures 302 and of the second graph data structures 304 are sufficiently similar due to the common view elements in both images to be combined into composite graph data structures 332. The combined graph data structure reduces or removes redundancy, and thus achieves an advantageous compression ratio. The main differences between the graph data structures of the first graph data structures 302 and the second graph data structures 304 are due to the non-overlapping views (e.g., the presence and absence of segment "8" and segment "9"), occlusions (e.g., the presence and absence of segment "7"), and segment ordering (e.g., the change in relationship between segment "3a" to segment "4" in the T3 first image 228 and in the T3 second image 230). Segment ordering in this context refers to the positional relation of various segments as seen through different camera viewpoints, e.g., a segment may be seen to the left or right (or top or down) of another segment. The graph data structures of the exemplary embodiment represent segment ordering by storing relative position information in each of the links connecting segments within the graph data structure.

The graph data structures of the composite graph data structures 332, such as the T1 composite graph data structure 334, store the video information contained in the first graph data structures 302 and the second graph data structures 304. For each identified segment, a reference segment is selected from one of the spatial images. The corresponding segments in the other spatial images, i.e., video streams, are then stored as residue information. The reference segment is chosen from among the available video streams to maximize the compression ratio, i.e., minimize image residue information for that segment in the other spatial images. Thus, the reference segments in a composite graph data structure are able to have come from different image frames at that same time instance. The processing of the exemplary embodiment does not use a predefined reference image. Links for each node in each of the video stream images is similarly also contained in the composite graph data structure.

The composite graph data structure 332 efficiently stores data for corresponding image segments. A set of corresponding image segments is made up of one segment in each of some or all of the images being processed that are identified as the same scene element. These corresponding image segments are assumed to be different views of the same scene element. The nodes of the composite graph data structure include a node for at least each of the corresponding image segments. The nodes of the composite graph data structure also include nodes for image segments that do not have corresponding segments in the other images being processed, as is the case when a scene element is only visible in one captured image. The representation of data in the composite graph data structures provides a compact representation of the multiple video streams and realizes encoding efficiencies when there is a high amount of similarity in the segment presentation between or among all captured images.

The difference in the graph data structures in the temporal dimension, i.e., the differences between graph data structures for the same video stream between time T1 206, time T2 208 and time T3 210, result, for example, from segment motion and camera motion. These motions cause effects such as covering/uncovering of existing segments as well as the appearance/disappearance of new/existing segments. These effects cause structural changes in the graph data structure over time.

A spatial-temporal video in the graph-based representation of the multiple video streams described above is able to have the Group Of Pictures (GOP) structure similar to the processing and encoding associated with MPEG video encoding. As is known for single video stream encoding, a GOP structure includes encoding a complete representation of an image frame, which is referred to as an "intracoded frame" or "I-frame" because the entire image data is contained within that frame, as required according to the encoding standard being used. Video encoding standards, such as MPEG video encoding standards, generally insert these complete image frames, or "I-frames," at regular temporal intervals. In addition to I-frames, other types of frames that contain less data for each image frame, such as predictive frames ("P-frames") and "bidirectional frames" ("B-frames") are also encoded and inserted into the video stream in between I-frames, as is known. Unlike conventional systems, however, embodiments of the present invention advantageously include I-frames, P-frames and B-frames that include information from multiple video streams.

Further, the video encoding of the exemplary embodiment of the present invention inserts an I-frame into the temporal run of a spatial-temporal video, i.e., the composite graph data structures 332, only when the graph data structure for the composite graph data structures 332 has significantly changed between captured time samples. As discussed in detail below, I-frames are not necessarily inserted according to a periodic schedule as is performed by conventional encoding techniques. A significant change in the image structure between time samples, which generally signals that a new scene has appeared in the video stream, is able to be readily detected in the exemplary embodiment due to the higher image intelligence available by analyzing the graph data structure of the video stream.

The exemplary embodiment of the present invention benefits from the intelligent time of insertion of I-frame information into an encoded video stream, which results in I-frames being more intelligently inserted at varying temporal intervals. This accomplishes higher compression ratios by allowing greater use of lower data content "P-frames" and "B-frames" instead of high data content "I-frames" to describe a similar scene. In the illustrated example, the T1 composite graph data structure 334 has image information similar to I-frames in an MPEG encoded video stream. The T2 composite graph data structure 336 has image information similar to MPEG B-frames and the T3 composite graph data structure 338 has image information similar to MPEG P-frames.

The procedure for creating a composite graph data structure is as follows. Segments within the images of each spatial frame are identified to produce sequence of segments, identified as $a_f^t, b_f^t, c_f^t, \ldots$, for time t and for spatial frame f, where $_Ca_f^t$ is the color-image of the segment $a_f^t$, and $_Pa_f^t$ is the position of segment $a_f^t$. A graph data structure is then created for each spatial frame. The graph data structure has one node that corresponds to each segment. Within these nodes, the position, size and shape of the image segments that are associated with root nodes are recorded and the relative positions of image segments associated with children nodes to their parent image segment, along with their size and shape, are also recorded. Graph "edges," i.e., links or arcs, are also stored in the graph data structure and describe relationships between nodes, such as parent and/or siblings.

The notation is used in the following description is defined as follows:

i. $^{ab}P_f^t$ is the relative position of segment a with respect to its parent, segment b, at time t in spatial frame f. If there are multiple paths from the root to any particular node in the graph, the system can pick a path based upon its own criteria (i.e. shortest path through other nodes, etc. . . . ).

ii. $r_f^t$ is the root segment at time t in spatial frame f

The spatial graphs for each time instant are merged into a single, composite graph data structure for that instant. The merged composite graph data structure contains all the connectivity, relative position, size and shape information of the separate graphs data structures for the separate image frames. For each identified image segment, a reference spatial frame is then identified and a function f(a,t) is constructed that returns this reference spatial frame for the segment a at time t.

The I-Frames for the spatial-temporal frame, such as the T1 composite graph data structure 334, are constructed as follows. The motion of the image segment associated with the root nodes from the reference frame for that root node to the other spatial frames is determined. The symbol $_S^{r_f r_g}M_{fg}^t$ represents a description of how a root node r moves between spatial frames f and g at the time t. This is referred to as spatial motion. The motion of each child segment from its own reference spatial frame to any other spatial frames is then determined. In general, the position of segment a in frame g at time t is determined by starting at the position of segment a in frame f at time t, as given by the following equation:

$$_Pa_g^t = _Pa_f^t - {}^{a i_n}P_f^t - {}^{i_n i_{n-1}}P_f^t - \ldots - $$
$$ {}^{i_1 r}P_f^t + {}^{r_f r_g}_S M_{fg}^t + {}^{r j_1}P_g^t + \ldots + {}^{j_{m-1} j_m}P_g^t + {}^{j_m a}P_g^t $$

where:

$r_f$ is a parent of $i_1$ is a parent of $i_2$ . . . is a parent of $i_n$ is a parent of a in frame f at time t, and $r_g$ is a parent of $j_1$ is a parent of $j_2$ . . . is a parent of $j_m$ is a parent of a in frame g at time t.

This process effectively begins at the absolute position of segment a in spatial frame f, then "crawling" up the graph to get to its root node, adding in the motion to get to the root node of spatial frame g, and then descending down g's graph to place segment a in its absolute position in the frame. In this embodiment, the absolute position $_Pa_f^t$, of the child segment is never stored; it can always be derived from the motion and relative offset terms. The exemplary embodiment only stores the absolute position of the reference root nodes. For example, the absolute position of a, given by $_Pa_f^t$, in any frame f is determined by starting at the absolute position of the reference root node as follows:

$$_Pa_f^t = _Pr_{f(r_t,t)}^t + {}^{r_{f(r_t,t)} r_f}_S M_{f(r_t,t)f}^t + {}^{r i_1}P_f^t + \ldots + {}^{i_{n-1} i_n}P_f^t + {}^{i_n a}P_f^t$$

where r is a parent of $i_1$, . . . , is a parent of $i_n$ is a parent of a

The processing then calculates the spatial residuals at time t for spatial frame f to spatial frame q according to the following equation:

$$_S^a R_{f(a,t)q}^t = {}_C a_{f(a,t)}^t \rightarrow {}_C a_q^t \forall q \epsilon q \neq f(a,t)$$

The residual $_S^a R_{f(a,t)q}^t$ describes how segment a changes visually (i.e. its color) from the reference a segment in spatial frame f(a,t) at time t to the corresponding a segment in any other spatial frame q at time t.

The processing next calculates the temporal motion from time $t_1$ to time $t_2$. Temporal motion for several quantities is determined as follows.

Temporal motion, represented as $$^{r_{f(r_1,t_1)} r_{f(r_2,t_2)}}_T M_{f(r_1,t_1)f(r_2,t_2)}^{t_1 t_2},$$

describes how a root node r moves between its reference frames $f(r_{t_1},t_1)$ and $f(r_{t_2},t_2)$ from times $t_1$ to $t_2$. Determining an absolute position of a segment is performed according to the following equation:

$$_Pa_g^{t_2} = _Pa_h^{t_1} - {}^{a i_n}P_h^{t_1} - {}^{i_n i_{n-1}}P_h^{t_1} - \ldots - $$
$$ {}^{i_1 r_h}P_h^{t_1} - {}^{r_h r_{f(r_1,t_1)}}_S M_{hf(r_1,t_1)}^{t_1} + $$
$$ {}^{r_{f(r_1,t_1)} r_{f(r_2,t_2)}}_T M_{f(r_1,t_1)f(r_2,t_2)}^{t_1 t_2} + $$
$$ {}^{r_{f(r_2,t_2)} r_g}_S M_{f(r_2,t_2)g}^{t_2} $$
$$ {}^{r j_1}P_g^{t_2} + \ldots + {}^{j_{m-1} j_m}P_g^{t_2} + {}^{j_m a}P_g^{t_2} $$

The above equation is equivalent to starting at a reference root node at time $t_1$ and traversing the graph structure to find the absolute position of some segment a in some spatial frame f at some time $t_2$, as follows:

$$_Pa_f^{t_2} = _Pr_{f(r_1,t_1)}^{t_1} + {}^{r_{f(r_1,t_1)} r_{f(r_2,t_2)}}_T M_{f(r_1,t_1)f(r_2,t_2)}^{t_1 t_2} + $$
$$ {}^{r_{f(r_2,t_2)}}_S M_{f(r_2,t_2)}^{t_2} + {}^{r i_1}P_f^{t_2} + \ldots + {}^{i_{n-1} i_n}P_f^{t_2} + {}^{i_n a}P_f^{t_2}$$

The difference in the two absolute positions of segment a in frame f at time $t_1$ and segment a in frame g and time $t_2$ is described by:

$$_Pa_g^{t_2} - _Pa_f^{t_1} = \begin{pmatrix} _Pr_{f(r_2,t_2)}^{t_2} + {}^{r_{f(r_2,t_2)} r_g}_S M_{f(r_2,t_2)g}^{t_2} \\ + {}^{r i_1}P_g^{t_2} + \ldots + {}^{i_{n-1} i_n}P_g^{t_2} + {}^{i_n a}P_g^{t_2} \end{pmatrix}$$
$$- \begin{pmatrix} _Pr_{f(r_1,t_1)}^{t_1} + {}^{r_{f(r_1,t_1)} r_f}_S M_{f(r_1,t_1)f}^{t_1} \\ + {}^{r j_1}P_f^{t_1} + \ldots + {}^{j_{m-1} j_m}P_f^{t_1} + {}^{j_m a}P_f^{t_1} \end{pmatrix}$$

which simplifies to:

$$_Pa_g^{t_2} - _Pa_f^{t_1} = -{}^{r_{f(r_1,t_1)} r_{f(r_2,t_2)}}_T M_{f(r_1,t_1)f(r_2,t_2)}^{t_1 t_2} + $$
$$ {}^{r_{f(r_2,t_2)} r_g}_S M_{f(r_2,t_2)g}^{t_2} - {}^{r_{f(r_1,t_1)} r_f}_S M_{f(r_1,t_1)f}^{t_1} + $$
$$ \Delta^{r_k r_{j_k}} P_{fg}^{t_1 t_2} + \ldots + \Delta^{r_l r_{j_l}} P_{fg}^{t_1 t_2} + {}^{i_{n-1} i_n}P_g^{t_2} - $$
$$ {}^{j_{m-1} j_m}P_f^{t_1} + {}^{i_n a}P_g^{t_2} - {}^{i_m a}P_f^{t_1} $$

where path-arcs k and l exist in both spatial-temporal graphs (in other words, $^{ab}P^{t_1}$ and $^{ab}P^{t_2}$ are matching path-arcs)

$$\Delta^{r_{i_k},r_{j_k}} P_{fg}^{t_1,t_2} + \ldots + \Delta^{r_{i_l},r_{j_l}} P_{fg}^{t_1,t_2} = \left( {}^{r_{i_k}} P_g^{t_2} - {}^{r_{j_k}} P_f^{t_1} \right) + \ldots +$$
$$\left( {}^{r_{i_l}} P_g^{t_2} - {}^{r_{j_l}} P_f^{t_1} \right)$$

The processing to calculate temporal residuals from $t_1$ to $t_2$ is given by the following equation:

$$_T^a R_{f(a,t_1)f(a,t_2)}^{t_1,t_2} = c\tilde{a}_{f(a,t_1)}^{t_1} \rightarrow c\tilde{a}_{f(a,t_2)}^{t_2}$$

The residual $_T^a R_{f(a,t_1)f(a,t_2)}^{t_1,t_2}$ describes how segment a changes visually (i.e. its color) from the reference a segment in spatial frame $f(a,t_1)$ at time $t_1$, to the corresponding reference a segment in spatial frame $f(a,t_2)$ at time $t_2$.

With the predicted spatial-temporal segment, $_c\tilde{a}_{f(a,t_2)}^{t_2}$, the spatial-temporal residual is given by:

$$_S^a R_{f(a,t_2)q}^{t_2} = c\tilde{a}_{f(a,t_2)}^{t_2} \rightarrow c\tilde{a}_q^{t_2} \; \forall \; q \in q \neq f(a, t_2)$$

where the predicted temporal reference segment at $t_2$ is:

$$c\tilde{a}_{f(a,t_2)}^{t_2} = c a_{f(a,t_1)}^{t_1} \times {}_T M^{t_1 t_2} + {}_T^a R_{f(a,t_1)f(a,t_2)}^{t_1 t_2}$$

where $_T M^{t_1 t_2}$ represents the compound temporal motion calculated above.

This predicted segment, at time $t_2$, is known as a P-Frame.

This expression can be carried further to predict the segment a in the remaining frames at time $t_2$:

$$c\tilde{a}_q^{t_2} =$$
$$\left( c a_{f(a,t_1)}^{t_1} \times {}_T M^{t_1 t_2} + {}_T^a R_{f(a,t_1)f(a,t_2)}^{t_1 t_2} \right) \times {}_S M^{t_2} + {}_S^a R_{f(a,t_2)q}^{t_2} \; \forall \; q \in q \neq f(a, t_2)$$

where $_c\tilde{a}_q^{t_2}$ is the predicted color of the segment a at time $t_2$ in spatial frame q, and $_S M^{t_2}$ is the compound spatial motion calculated above.

In accordance with MPEG convention, given two segments a at times $t_1$ (an I-Frame) and $t_3$ (a P-Frame), we can further predict a new a which lies between them temporally at time $t_2$. This new interpolated segment is called a B-Frame. In other words:

$$c\tilde{a}_{f(a,t_2)}^{t_2} =$$
$$B\left( c a_{f(a,t_1)}^{t_1} \times {}_T M^{t_1 t_2} + {}_T^a R_{f(a,t_1)f(a,t_2)}^{t_1 t_2}, c\tilde{a}_{f(a,t_3)}^{t_3} \times {}_T M^{t_3 t_2} + {}_T^a R_{f(a,t_3)f(a,t_2)}^{t_3 t_2} \right)$$

where $B(.)$ is some function which blends the two predicted segments. Similarly, we can use another blending function to blend both predictive relative positions (from I to B, and from P to B).

The quantity a in the remaining spatial frames q at time $t_2$ can be predicted from the predicted reference segment, $_c\tilde{a}_{f(a,t_2)}^{t_2}$, according to the following equation:

$$c\tilde{a}_q^{t_2} = c\tilde{a}_{f(a,t_2)}^{t_2} \times {}_S M^{t_2} + {}_S^a R_{f(a,t_2)q}^{t_2} \; \forall \; q \in q \neq f(a, t_2)$$

An example of segment encoding within the exemplary composite graph data structure 332 that corresponds to a multiple view video stream 200 is as follows.

I-Frame encoding within the T1 graph data structure 334:

$$\left\{ c a_{f(a,t_1)}^{t_1}; {}_S^a R_{f(a,t_1)q}^{t_1}; {}_S^{r_f(r_1,t_1)^{r_q}} M_{f(r_1,t_1)q}^{t_1}; \right.$$
$$\left. p r_{f(r_1,t_1)}^{t_1}, {}^{r_1} P_q^{t_1}, \ldots, {}^{i_{n-1}i_n} P_q^{t_1}, {}^{i_n a} P_q^{t_1} \right\} \; \forall \; q \in q \neq f(a, t_1)$$

P-Frame encoding within the T3 graph data structure 338:

$$\left\{ {}_T^a R_{f(a,t_1)f(a,t_3)}^{t_1 t_3}, {}_S^a R_{f(a,t_3)q}^{t_3}; {}_T^{r_f(r_1,t_1)^{r_f(r_3,t_3)}} M_{f(r_1,t_1)f(r_3,t_3)}^{t_1 t_3}, \right.$$
$${}_S^{r_f(r_3,t_3)^{r_q}} M_{f(r_3,t_3)q}^{t_3}; \Delta^{r_{i_k},r_{j_k}} P_{f(a,t_1)f(a,t_3)}^{t_1 t_3} + \ldots + \Delta^{r_{i_l},r_{j_l}} P_{f(a,t_1)f(a,t_3)}^{t_1 t_3},$$
$$\left. {}^{r_1} P_q^{t_3}, \ldots, {}^{i_{n-1}i_n} P_q^{t_3}, {}^{i_n a} P_q^{t_3} \right\} \; \forall \; q \in q \neq f(a, t_3)$$

B-Frame encoding within the T2 graph data structure 336:

$$\left\{ {}_T^a R_{f(a,t_1)f(a,t_2)}^{t_1 t_2}, {}_T^a R_{f(a,t_3)f(a,t_2)}^{t_3 t_2}, {}_S^a R_{f(a,t_3)q}^{t_3}; \right.$$
$${}_T^{r_f(r_1,t_1)^{r_f(r_2,t_2)}} M_{f(r_1,t_1)f(r_2,t_2)}^{t_1 t_2}, {}_T^{r_f(r_3,t_3)^{r_f(r_2,t_2)}} M_{f(r_3,t_3)f(r_2,t_2)}^{t_3 t_2},$$
$${}_S^{r_f(r_2,t_2)^{r_q}} M_{f(r_2,t_2)q}^{t_2}; \Delta^{r_{i_k},r_{j_k}} P_{f(a,t_1)f(a,t_2)}^{t_1 t_2} + \ldots + \Delta^{r_{i_l},r_{j_l}} P_{f(a,t_1)f(a,t_2)}^{t_1 t_2},$$
$$\Delta^{r_{i_u},r_{j_u}} P_{f(a,t_3)f(a,t_2)}^{t_3 t_2} + \ldots + \Delta^{r_{i_v},r_{j_v}} P_{f(a,t_3)f(a,t_2)}^{t_3 t_2},$$
$$\left. {}^{r_1} P_q^{t_2}, \ldots, {}^{i_{n-1}i_n} P_q^{t_2}, {}^{i_n a} P_q^{t_2} \right\} \; \forall \; q \in q \neq f(a, t_2)$$

The graph-segmentation approach used by the exemplary embodiment of the present invention achieves high compression efficiency for multiple video streams by providing several unique features. The exemplary embodiment of the present invention compactly represents multiple video streams into one graph data structure representation. Temporal image updates are directly performed and maintained in that graph data structure representation. The exemplary embodiment advantageously reduces the processing overhead associated with updating and maintaining separate representations, so as to increase processing efficiency. The exemplary embodiment is further able to more efficiently encode a uniform image segment by using a single DC term without requiring an image transform, such as a Discrete Cosine Transform (DCT). Embodiments of the present invention can include only a few DCT coefficients to more accurately encode segments with color gradients, or any number of DCT coefficients can be encoded for further improvements in image detail.

Additionally, the exemplary embodiment flexibly allows aggregating image segments into an object description as discussed above. Object descriptions allow updates to the encoded image data, such as in P-frames and B-frames, to specify fewer parameters than would updates for each of the individual segments that constitute the aggregated object. In the exemplary embodiment, an object is formed by observing the graph structure through time. The exemplary embodiment also allows the flexibility of selecting levels of aggregation of image segments. Available segment aggregation ranges from identifying large objects with many segments down to and including individually encoding all of the basic image segments without aggregating them into objects. Even without aggregating image segments in the video streams into objects, the encoding performed by the exemplary embodiment of the present invention that processes image segments as single color blocks is still more efficient than the encoding of a block that contains varying textures by determining high order DCT coefficients.

The exemplary embodiment of the present invention further provides access to complete segment information, including texture, motion, shape, position, size, and links to other segments, for correspondence matching of segments between and among video streams. The graph data structure of the exemplary embodiment further allows for robustly estimating motion/disparity with high stability. When motion/disparity estimation is robust and stable, compression ratios and video quality are correspondingly high.

During operation, the exemplary embodiment of the present invention selectively inserts an I-frame within a group of pictures by detecting when the graph data structure has significantly changed in the temporal dimension. Such significant changes, and the corresponding insertion of an I-frame graph data structure, can be triggered, for example, by observing changes in a percentage of image segments and/or links between segments that exceed a specified percentage threshold. Such a threshold is able to be established, for example, by statistical measurements or empirical observations of data compression performance in relation to various threshold settings. The specified percentage is able to be adjusted to cause a resulting change in the number of higher data content I-frames and to correspondingly adjust the data rate required to encode the multiple video streams. This advantageously reduces the number of I-frames required to encode video and thus increases achievable compression ratios. The exemplary embodiment is also able to be configured to insert I-frame data at a more regular interval in, for example, a high-motion scene to increase video quality.

The graph data structure of the exemplary embodiment of the present invention coherently places attributes that describe image segment nodes adjacent to each other. This intra- and inter-node coherency is also exploited in the exemplary embodiment to reduce the redundancy among the underlying data. This is referred to as a second-level compression and is similar to run-length or arithmetic coding of motion vectors of macroblocks.

The exemplary embodiment of the present invention further allows adjustment of the data encoding bitrate by changing the threshold to be used for segmenting the videos. This parameter provides an extra level of bitrate adjustment. Further, the graph-segmentation approach of the exemplary embodiment is able to be advantageously used in MPEG-7 for video content retrieval due to the inherent object descriptions and structures provided by the graph data structures described above. Content retrieval systems use such "higher-level" image descriptions to produce more robust and successful query results.

The exemplary embodiment of the present invention maintains graph data structures, including the graph data structures that correspond to the first graph data structures 302, the graph data structures that correspond to the second graph data structures 304 and the composite graph structures 332, through the use of a graph data structure software package.

The graph data structures are dynamically changed by inserting, deleting, splitting, merging, and/or replacing nodes and links between the nodes.

In the graph data structure of the exemplary embodiment, nodes are built of primitive components called fields. Fields are the attributes and the interface of the node data object. A field in the exemplary embodiment has the following characteristics.

A value, with possibly a default value.

A type of the value. Within a type of value, it can either be a single field (with the prefix SF: i.e., a field with a single value, even if the value has two, three or four components), or a multiple field (with a prefix MF: i.e., a field that contains an array of values).

A type of behavior, which tells whether the field is constant (field), modifiable (exposedField), only a source of events (eventOut), or only a target of events (eventIn). An exposedField may be both source and target of events; an initial value may be specified for field and exposedField, not for eventIn and eventOut.

A name, which is a plain string for documentation purposes, as it does not appear in the binary stream.

In order to support compressing multiple video streams, five types of basic data are contained within each field. Fields in the exemplary embodiment contain one or more of textures, shapes, positions, and node links. Textures include image data or residues between, for example, the first video stream images and second video images. Shapes describe the physical shape of a segment. Positions indicate the position of a segment in the image. Internal graph-nodes have fields that contain color, shape and outgoing links. Root graph-nodes contain position, color, shape, and outgoing links. Graph edges, i.e., node links reflect the relationship of nodes within a graph and contain motion and scale information.

Figure 4:
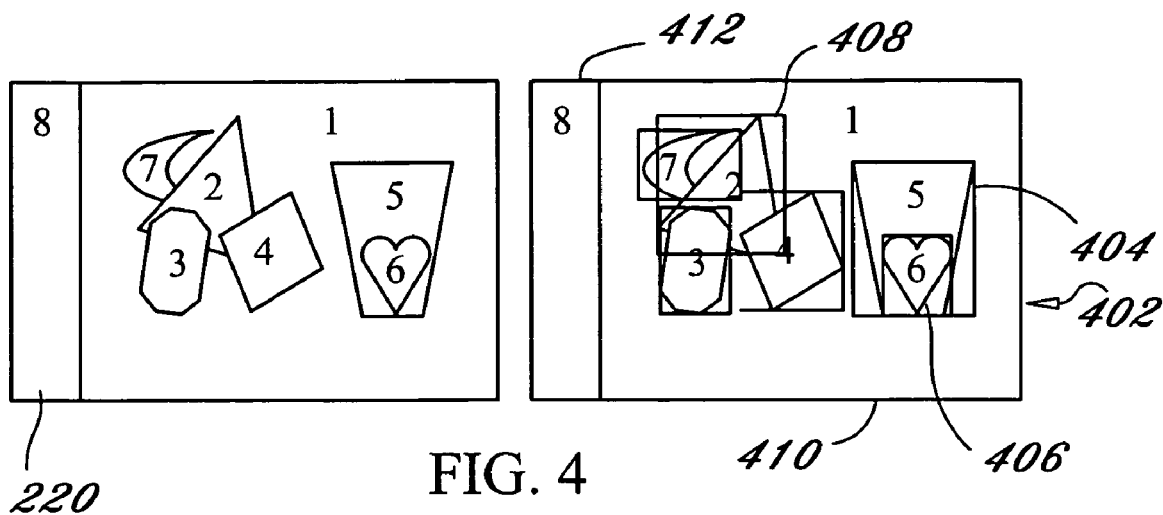
FIG. 4 illustrates image segmentation as performed by exemplary embodiments of the present invention.

FIG. 4 illustrates image segmentation 400 as performed by exemplary embodiments of the present invention. The T1 first image 220 is shown on the left and identified image segments 402 are delineated on the right. In order to facilitate segment identification processing, the exemplary embodiment of the present invention utilizes a modified version of MPEG-4 arbitrarily shaped video objects coding to encode the shape of the segments. For example, instead of using fixed-size macroblocks, varying-size macroblocks are employed that enclose an entire segment. This is apparent in the identified image segments 402 in this example.

Figure 5:
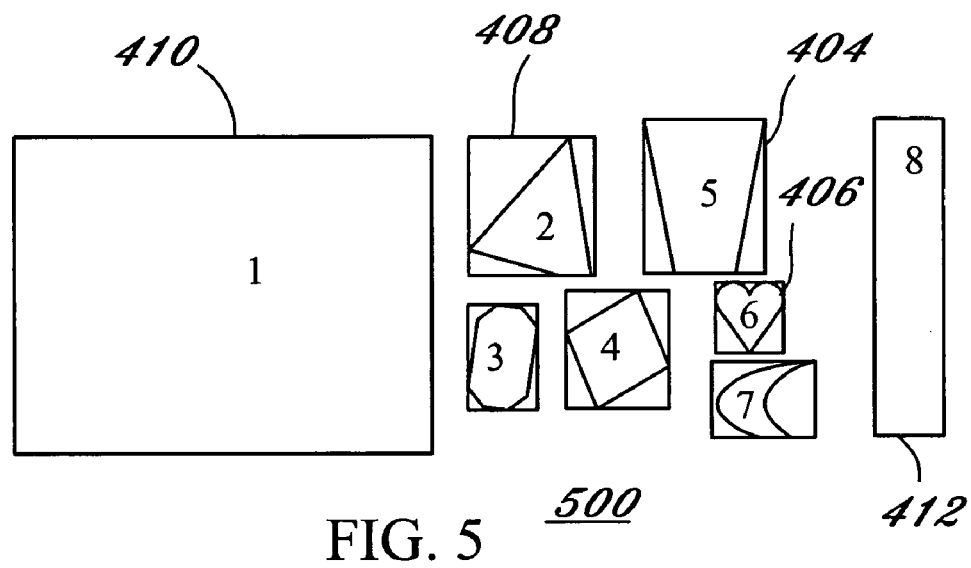
FIG. 5 illustrates the individual segments within the exemplary identified segments.

FIG. 5 illustrates the individual segments 500 within the exemplary identified segments 402. In homogeneous opaque and transparent regions, such as segment "8" in this example, the macroblock size is set to the largest possible size, such as with the eighth block 412 that encloses segment "8" in this example. Further segments, which are approximated by rectangular borders are also shown, including a first block 410 that encloses segment "1," a second block that encloses segment "2," a fifth block 404 that encloses segment "5," and a sixth block that encloses segment "6." As noted above, the macroblocks that define each identified image segment have varying size depending on the size of the identified image segment.

At the boundaries, however, the segment identification processing of the exemplary embodiment uses a smaller boundary macroblock size, such as a first macroblock 408 that encloses segment "2" in this example. Uniform image segments, such as segment "8" in this example, are identified and the entire segment is represented with a single DC color term. Such uniform image segments also do not require a transform or further macroblock partitioning.

Figure 6:
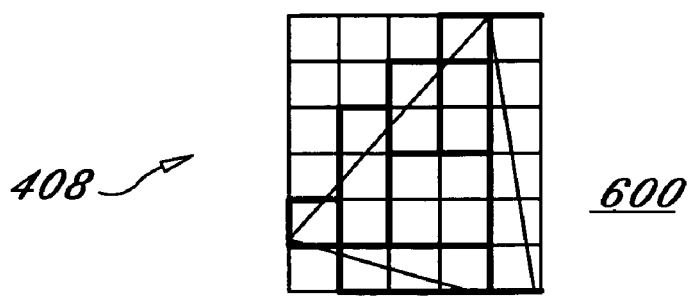
FIG. 6 illustrates further sub-partitioning of an image segment as is performed by the exemplary embodiment of the present invention.

FIG. 6 illustrates further sub-partitioning 600 of an image segment as is performed by the exemplary embodiment of the present invention. The sub-partitioning 600 illustrates dividing the second macroblock 408 into multiple sub-macroblocks. In this example, the sub-macroblocks have a uniform size, although that is not required and variable sub-macroblock sizes are able to be used according to processing requirements.

Since the graph structures resemble the scene structures, the graphs can be exploited for robust and stable motion and disparity estimation. The motion and disparity estimation procedure includes: (1) comparing the texture color of the segments, (2) comparing the node connectivity of the segments, (3) comparing the shape, size, and position of the segments, and (4) comparing the motion vectors from the previous temporal frames.

Figure 7:
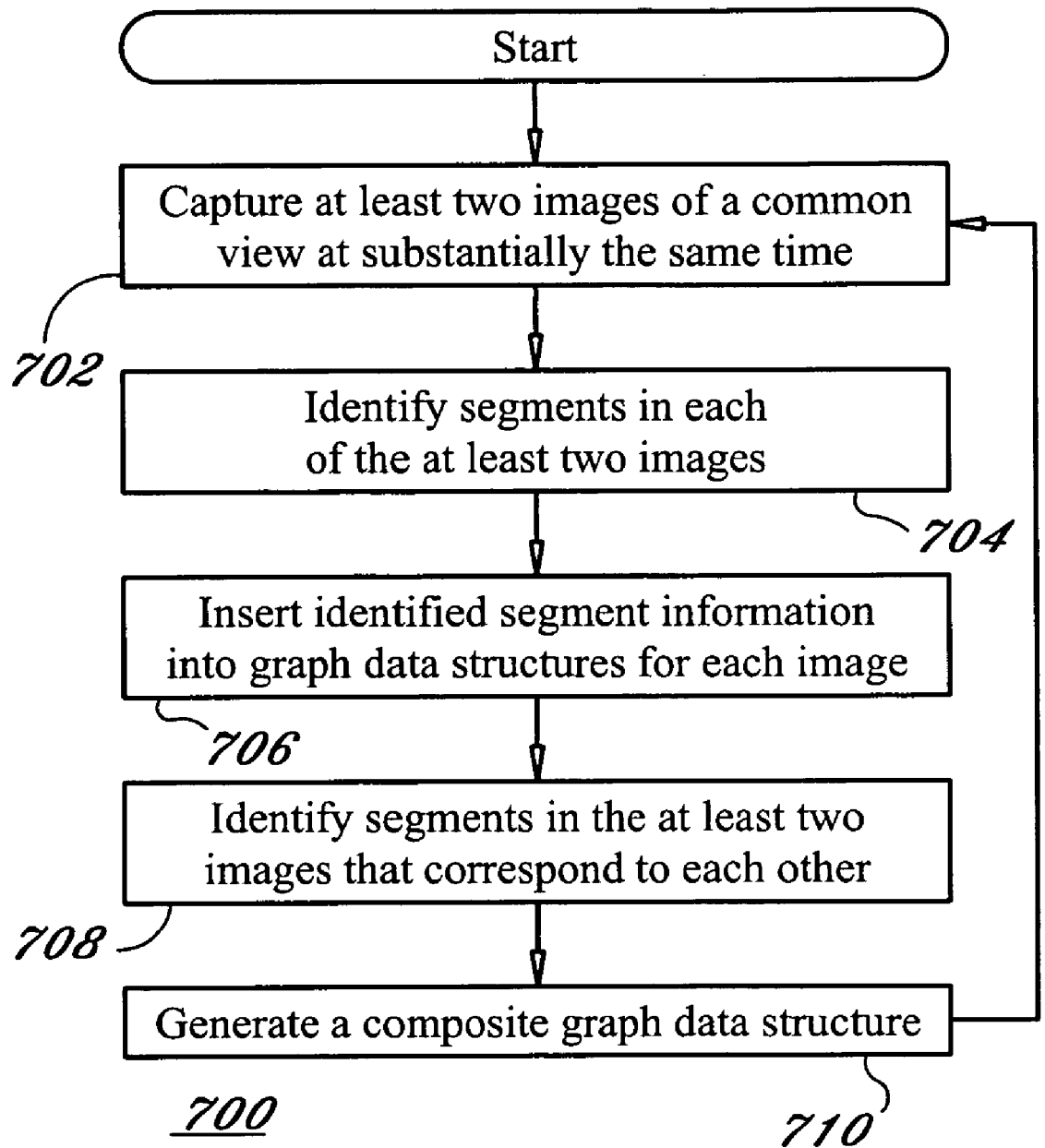
FIG. 7 illustrates a multiple video stream encoding top level processing flow diagram according to the exemplary embodiment of the present invention.

FIG. 7 illustrates a multiple video stream encoding top level processing flow 700 diagram according to the exemplary embodiment of the present invention. The multiple video stream encoding begins by capturing, at step 702, at least two images of an at least first partially common view of a first scene that was captured at substantially a first time. These images are captured in the exemplary embodiment by the first video camera 104, the second video camera 106 and the third video camera 108, as is described above. These images capture a partially common view because, for example, image areas captured by some video cameras do not completely overlap image areas captured by other video cameras.

The processing next identifies, at step 704, image segments in each of the at least two captured images. Image segments are identified in the exemplary embodiment by segment analyzers, such as the first segment analyzer 110, as is described above. The processing next creates graph data structures by inserting, at step 706, identified image segment information into graph data structures for each image. As noted above, the exemplary embodiment maintains graph data structures for each image, although further embodiments of the present invention are able to use a single graph data structure or fragment data among different graph data structures as best suited for various processing architectures. Inserting identified image segment information into the graph data structures further involves specifying at least one link between nodes of the graph data structure to describe relationships between the two identified image segments that are associated with the two nodes being joined by a link.

The processing next identifies, at step 708, segments in the at least two images that correspond to each other. Image segment correspondence is facilitated due to the compact and readily available information contained in the composite graph data structures maintained by the exemplary embodiment of the present invention. The processing then generates a composite graph data structure that represents the image segment information and relationships for image segments identified within the at least two captured images. The processing then returns to capture, at step 702, the next at least two images of the video stream. These next captured images are captured at substantially a second time and capture at least a second partially common view of a second scene. This second scene is typically, but not necessarily, the same or a slightly changed version of the first scene. The second scene is also able to be a completely different scene from the first scene.

Figure 8:
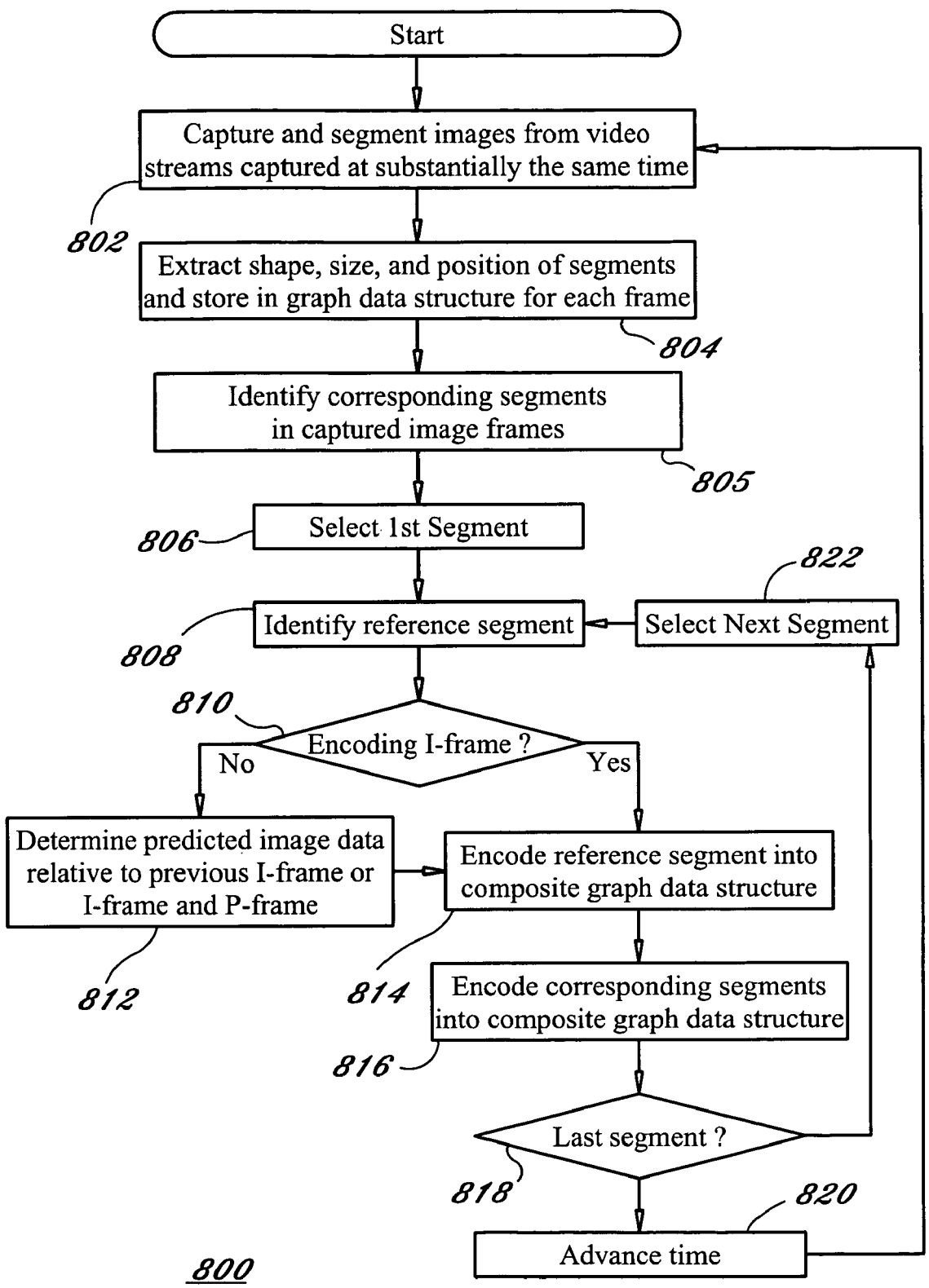
FIG. 8 illustrates an overall graph-segmentation based video compression process according to the exemplary embodiment of the present invention.

FIG. 8 illustrates a graph-segmentation based video compression process 800 according to the exemplary embodiment of the present invention. The processing begins by capturing and segmenting, at step 802, images from video streams that were captured at substantially the same time. The exemplary embodiment performs this by converting video frames into a YUV format to allow for chroma subsampling. The processing also over-segments the images and uses a threshold to control allowances for color gradients that can be contained within an identified image segment.

Segmenting in the exemplary embodiment is accomplished by defining a rectangular mask for each segment that fully contains that segment as opposed to defining segments by tracing the segment contours. The size of this rectangular mask in the exemplary embodiment is specified by multiples of macroblocks used to process this image. This segmenting procedure places a rectangular mask, which is able to have varying size and is able to overlap other segments, that covers the entire segment. The use of rectangular blocks results in less texture and position encoding processing overhead, especially for a large homogeneous segment. The segmenting of the exemplary embodiment then places multiples of rectangular masks, which have a fixed-size and conform to a grid, so as to cover the entire segment. Each fixed-size rectangular mask in this processing may only partially cover a segment.

The processing next extracts, at step 804, the shape, size, and position of the segments and determines the relationship of the segments to each other. Extracting this information characterizes the segments and facilitates spatial matching of image segments across the multiple images of a scene, such as those captured by the various cameras, such as first video camera 104, second video camera 106 and third video camera 108. The relationship of segments to each other in the exemplary embodiment includes segments overlapping other segments and/or a segment being fully contained within another segment, as is described above. Each identified image segment and its characteristics for each image frame is then stored into a graph data structure associated with that image frame.

The processing next identifies, at step 805, corresponding image segments in each image frame. The processing of the exemplary embodiment includes identifying corresponding image segments in the image frames that were captured at substantially the same time as well as identifying corresponding image segments in image frames captured at different times. Identifying corresponding image segments in the exemplary embodiments is performed by sorting the nodes within each of the graph data structures that are associated with each image. Node sorting is performed according to the number of connected children nodes, and according to the number of connected parent and bidirectional nodes. Similar nodes, and the corresponding image segments associated with those nodes, are determined by their having, for example, similar color, graph structure within the graph data structure, similar shape, size, and position, and similar motion vectors as observed over time.

The processing next selects, at step 806, a first segment to process. The processing next identifies, at step 808, a reference segment for the currently processed image segment. The reference segment selected by the exemplary embodiment is selected from among the segments in the multiple image frames that were captured at substantially the same time that correspond to the image being processed. The reference segment is fully encoded in the composite graph data structure 332 and is used as a basis for determining the residue of the corresponding segments in the other image frames. The composite graph data structure 332 stores the image data for the reference segment but only the residual image data for corresponding segments in the other image frames. The reference segment is chosen to maximize compression ratio, and thus minimize residues. Thus, the reference segments in a composite graph are able to come from different image frames at that same time instance.

The processing then determines, at step 810, if the image frames being currently processed are to be encoded as an I-Frame spatial-temporal data. If it is determined the image frames are not to be encoded as I-Frame spatial-temporal data, the processing determines, at step 812, predicted image data. The predicted image data is able to be in the form corresponding to P-Frame spatial-temporal image data or B-Frame spatial-temporal data. P-Frame spatial-temporal data is determined by determining the prediction data relative to the last I-Frame spatial-temporal data, as determined by the image capture time, that was encoded into the composite graph data structure 332. B-Frame spatial-temporal data is determined by determining the prediction data relative to the last I-Frame spatial-temporal data and to the next P-Frame spatial-temporal image data, as determined by the image capture time, that was encoded into the composite graph data structure 332. Determining if image data is to be encoded as I-Frame, P-Frame or B-Frame spatial-temporal data in the exemplary embodiment is based upon the time that the images are captured. The exemplary embodiment does not have equivalents of I-Frames, P-Frames or B-Frames for the spatial dimension, i.e., for the various images captured by different cameras at substantially the same time.

If image data is to be encoded as an I-Frame spatial-temporal data or after the predicted image data is determined, the processing encodes, at step 814, the reference image segment. The reference segment is encoded as one of an I-Frame, P-Frame or B-Frame according to the time at which the image segments being processed were captured. Reference segments are fully encoded when encoding I-Frame spatial-temporal data. Reference frames for P-Frames and B-Frames are encoded only as prediction data for that segment relative to the image data encoded in an I-Frame (for P-Frames) or an I-Frame and P-Frame (for a B-Frame). In the exemplary embodiment, the image from which the reference segment is selected is able to change over time.

The processing continues by encoding, at step 816, the corresponding segments in the other image frames captured at this time instant into the composite graph data structure 332. The residual image data relative to the reference segment is encoded for these corresponding segments.

The processing next determines, at step 818, if this is the last image segment to be processed. If this is not the last image segment to be processed, the processing selects, at step 822, the next image segment to process. Image segments that appear in only one image frame are also encoded into the composite graph data structure, although such segments have no corresponding image segments in other image frames. After this selection the processing continues by identifying, at step 808 a reference segment for this newly selected segment. The processing then continues as described above.

If it is determined that this is the last image segment within the image frames captured at substantially the same time and being processed, the processing advances, at step 820, the time of image capture. The processing then continues by capturing and segmenting, at step 802, images from video streams that were captured at substantially the same time. The processing then continues as described above.

Figure 10:
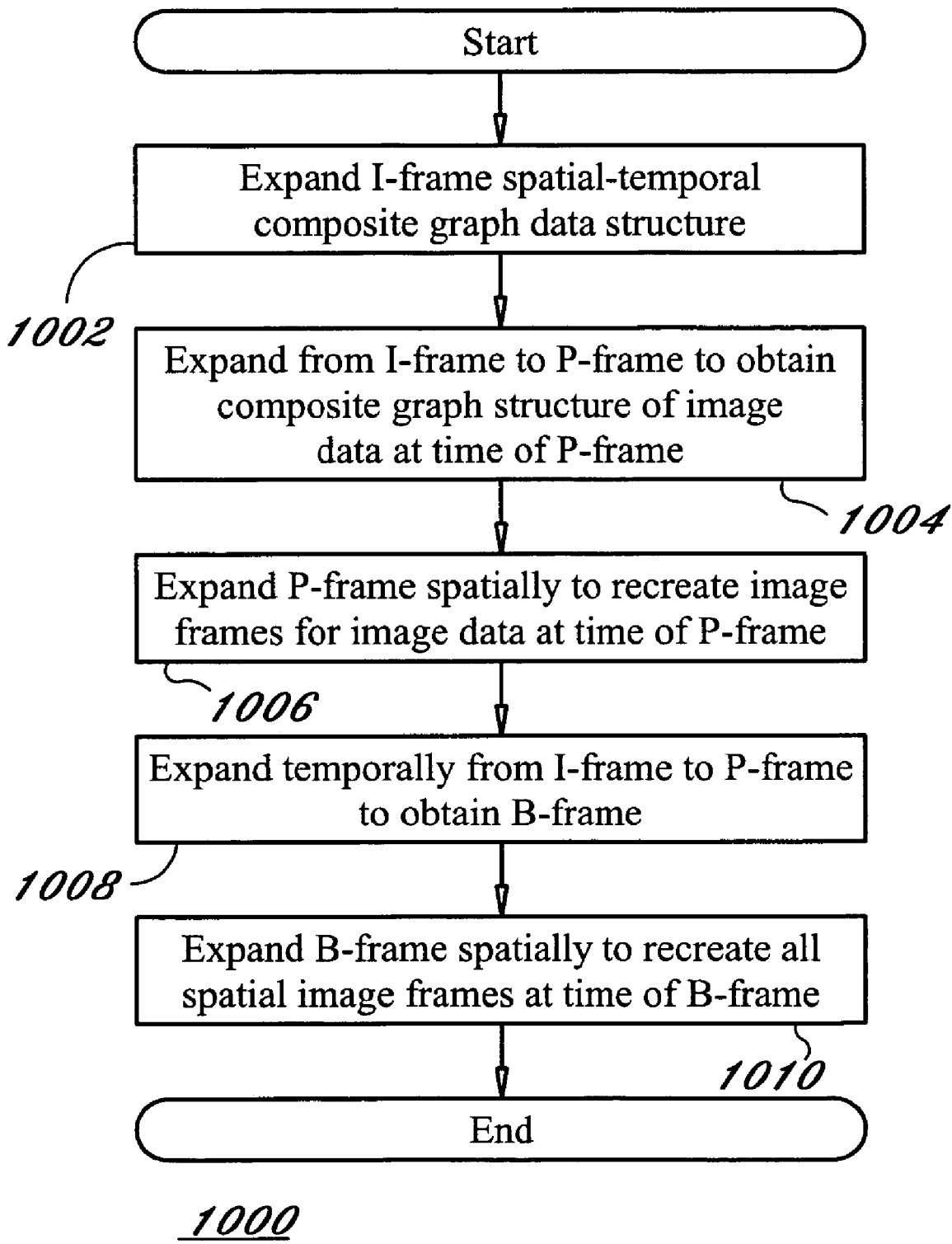
FIG. 10 illustrates a multiple video stream reconstruction processing flow diagram according to an exemplary embodiment on the present invention.

FIG. 10 illustrates a multiple video stream reconstruction processing flow diagram 1000 according to an exemplary embodiment on the present invention. Recreating the multiple video streams from a spatial-temporal graph data structure, such as the exemplary composite graph data structure 332 described above. The recreation of multiple video streams starts with at an I-Frame spatial-temporal composite graph data structure and expands, at step 1002, that graph data structure in the spatial dimension to obtain all of the spatial frames that were captured at that I-Frame's time instance. The processing then expands, at step 1004, in the temporal dimension from the I-Frame spatial-temporal frame to a P-Frame spatial-temporal frame. This expansion reverses the predicted image data that was determined in step 812 of FIG. 8, described above. This expansion produces the composite graph data structure with encoded reference image segments and encoded residual for encoded corresponding image segments.

Figure 9:
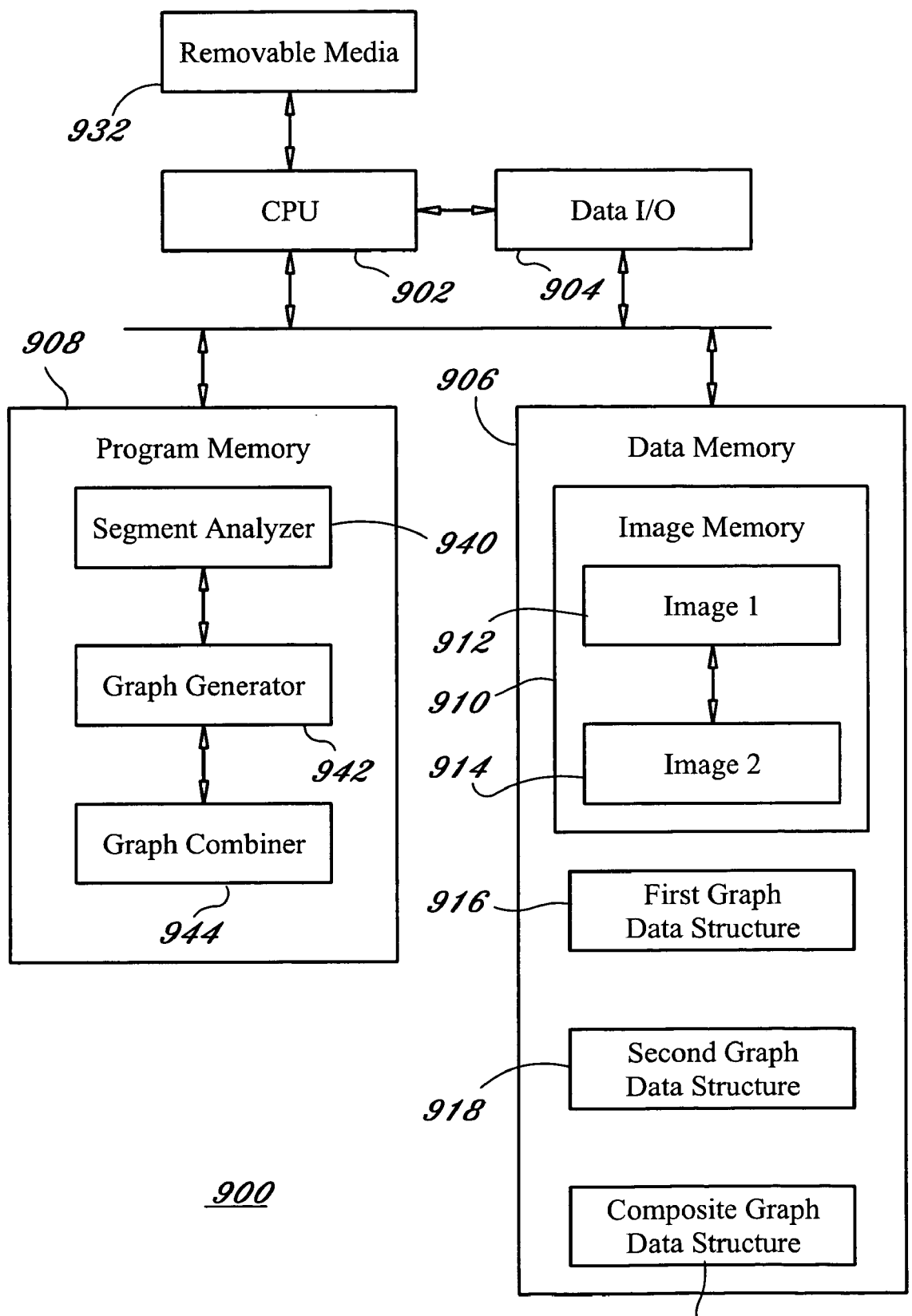
FIG. 9 is a block diagram for a multiple video stream encoding system according to one embodiment of the present invention.

The processing next expands, at step 1006, the P-Frame spatial-temporal frame in the spatial dimensions to recreate all of the spatial frames at the P-Frame's spatial-temporal frame time instance. The processing next temporally expands, at step 1008, from an I-Frame spatial-temporal frame and a P-Frame spatial-temporal frame to obtain a B-Frame spatial-temporal frame. The processing next expands, at step 1010, the B-Frame spatial-temporal frame in the spatial dimensions to recreate all the spatial frames at the B-Frame's spatial-temporal time instance FIG. 9 is a block diagram for a multiple video stream encoding system 900 according to one embodiment of the present invention. This exemplary multiple video stream encoding system 900 is a specialized digital processing system. The multiple video stream encoding system 900 includes a Central Processing Unit (CPU) 902. The CPU 902 of the exemplary embodiment includes a programmable processor as well as specifically constructed digital processing units optimized to rapidly perform highly repetitive processing tasks required by this exemplary embodiment. Further embodiments of the present invention include distributed digital and/or image processing units that are fully or partially programmable and/or configured to perform fixed processing functions.

The multiple video stream encoding system 900 of the exemplary embodiment includes a removable media device 932 to allow a computer program product to be provided to the multiple video stream encoding system in order to support the operations described herein. The exemplary multiple video stream encoding system 900 further has a data Input/Output (I/O) port 904 to allow exchange of digital data. The data I/O port 904 is used, for example, to receive digitized captured image and/or video data and to send encoded multiple view video data.

The components within the multiple video stream encoding system 900 communicate via a data bus 930. Data bus 930 of the exemplary embodiment is a high speed internal data bus. Further embodiments expand the data bus 930 to include operation of multiple video stream encoding systems over, for example, distributed processing systems.

The multiple video stream encoding system 900 of the exemplary embodiment includes a data memory 906 that is used to store video image data and intermediate processing information as described below. Data is communicated and exchanged between the CPU 902 and the data memory 906 via data bus 930 in the exemplary embodiment. Data memory 906 has an image memory 910 that has storage for at least two images: image 1 912 and image 2 914 in this example. This image data corresponds to captured images of the different video streams being processed and encoded, such as the first video stream 202 and the second video stream 204. Data memory 906 further includes storage for a first data graph structure 916, a second graph data structure 918 and a composite graph data structure 920. Single copies of these data items are illustrated for ease of understanding and simplicity of description. The data memory of the exemplary embodiment is able to store multiple copies of these data items as are required for the processing described above.

The multiple video stream encoding system 900 of the exemplary embodiment includes a program memory 908. The program memory 908 of the exemplary embodiment contains program code that is executed by the CPU 902 to perform the processing of the present invention. Further embodiments of the present invention include dedicated processors that are configured to perform at least a portion of the processing defined by the program code contained within program memory 908. Program memory 908 communicates and exchanges data with CPU 902 via data bus 930 in the exemplary embodiment.

Program memory 908 includes a segment analyzer 940 that includes programming instructions to control the processing of images stored in image memory 910, such as image 1 912 and image 2 914, to identify segments within each image. Embodiments of the present invention operate with any image segmentation algorithm that decomposes an image into homogenous color regions.

Program memory 908 further includes programming instructions for a graph generator 942 that generates graphs that include the segment information, as described above. The program memory 908 further includes programming instructions for a graph combiner 944 that produces composite graph data structures as described above.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows a the computer to read data, instructions, messages or message packets, and other computer readable information. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The terms "a" or "an", as used herein, are defined as one or more than one. The term plurality, as used herein, is defined as two or more than two. The term another, as used herein, is defined as at least a second or more. The terms including and having, as used herein, are defined as comprising (i.e., open language). The term coupled, as used herein, is defined as connected, although not necessarily directly, and not necessarily mechanically.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for encoding multiple view video streams on a video stream encoding system, the method comprising the steps of:

identifying, with a segment analyzer, a first plurality of identified image segments within a first image of a first plurality of images, the first plurality of images having been captured at substantially a first time and capturing a first at least partially common view of a first scene;

identifying, with the segment analyzer, a second plurality of identified image segments within a second image of the first plurality of images;

identifying, with the segment analyzer within the first plurality of identified image segments and within the second plurality of identified image segments, a first set of corresponding image segments, wherein each image segment within the first set of corresponding image segments is a respective image segment that correspond to a respective common object within the first scene, the respective common object having a respective image segment that is present in both the first image and the second image;

creating, with a graph generator, a first graph data structure for the first image, the first data graph structure comprising a first plurality of nodes with node in the first plurality of nodes being associated with a respective image segment of the first image that is within the first set of corresponding image segments; and specifying, with the graph generator, at least one link between a first node and a second node within the first plurality of nodes within the first graph data structure, each of the at least one link indicating a relationship between a first image segment and a second image segment, wherein the first image segment is associated with the first node and the second image segment is associated with the second node.

2. The method of claim 1, wherein image data for at least one of the second plurality of identified image segments associated with at least one of the nodes of the first plurality of nodes is stored as residual image data relative to image data for a corresponding image segment within the first plurality of identified image segments.

3. The method of claim 1, wherein the relationship between the first image segment and the second image segment is one of the first image segment partially overlapping the second image segment, the first image segment being enclosed within the second image segment, and the first image segment splitting into at least two image segments.

4. The method according to claim 1, further comprising the steps of:

identifying, with the segment analyzer, a third plurality of identified image segments within a third image that is within a second plurality of images, the second plurality of images having been captured at substantially a second time that is different than the first time, the third plurality of identified image segments capturing a second at least partially common view of a second scene;

identifying, with the segment analyzer, a fourth plurality of identified image segments within a fourth image that is within the second plurality of images;

identifying, with the segment analyzer within the third plurality of identified image segments and within the fourth plurality of identified image segments, a second set of corresponding image segments, wherein each image segment within the second set of corresponding image segments is a respective image segment that correspond to a respective common object within the second scene, the respective image segment being present in both the third image and the fourth image:

creating, with the graph generator, a second graph data structure for the third image, the first data graph structure comprising a second plurality of nodes with each of the nodes in the second plurality of nodes being associated with a respective image segment within the second set of corresponding image segments; and specifying, with the graph generator, at least one link between a third node and a fourth node within the second plurality of nodes within the second graph data structure, each of the at least one link between the third node and the fourth node indicating a relationship between a third image segment and a fourth image segment, wherein the third image segment is associated with the third node and the fourth image segment is associated with the fourth node.

5. The method of claim 4, wherein image data for at least one of the third plurality of identified image segments is stored as residual image data relative to an image within the first plurality of images.

6. The method of claim 4, wherein the second graph data structure encodes image data as one of a P-frame and a B-frame relative to image data stored in the first graph data structure.

7. The method of claim 4, further comprising the step of:
determining, with the graph generator, a change between the first plurality of identified image segments and the third plurality of identified image segments that is greater than a threshold,
wherein the step of creating the second graph data structure comprises encoding, in response to determining the change is greater than the threshold, image data into at least one node within the second graph data structure as an I-frame.

8. The method of claim 4, wherein the step of creating the second graph data structure comprises modifying at least one of the nodes within the first graph data structure to specify at least one of a translation and a rotation observed for at least one of the identified image segments between the first time and the second time.

9. The method of claim 4, further comprising the steps of:
producing, with a graph combiner, a composite graph data structure storing image segment attributes and relationships for all video streams captured by multiple video cameras; and
producing, with the graph combiner, an encoded data stream, based upon the composite graph data structure, representing a plurality of video streams capturing the first at least partially common view and the second at least partially common view.

10. A multiple video stream capture and encoding apparatus comprising:
at least one segment analyzer that:
identifies a first plurality of identified image segments within a first image of a first plurality of images having been captured at substantially a first time and capturing a first at least partially common view of a first scene;
identifies a second plurality of identified image segments within a second image of the first plurality of images;
identifies, within the first plurality of identified image segments and within the second plurality of identified image segments, a first set of corresponding image segments, wherein each image segment within the first set of corresponding image segments is a respective image segment that correspond to a respective common object within the first scene, the respective common object having a respective image segment that is present in both the first image and the second image; and
a composite graph generator that
creates a first graph data structure for the first image, the first data graph structure comprising a first plurality of nodes with each node in the first plurality of nodes being associated with a respective image segment of the first image that is within the first set of corresponding image segments; and
specifies at least one link between a first node and a second node within the first plurality of nodes within the first graph data structure, each of the at least one link indicating a relationship between a first image segment and a second image segment, wherein the first image segment is associated with the first node and the second image segment is associated with the second node.

11. The multiple video stream capture and encoding apparatus of claim 10, wherein the composite graph generator stores image data for at least one of the second plurality of identified image segments associated with at least one of the nodes of the first plurality of nodes as residual image data relative to image data for a corresponding image segment within the first plurality of identified image segments.

12. The multiple video stream capture and encoding apparatus of claim 10, wherein the relationship between the first image segment and the second image segment is one of the first image segment partially overlapping the second image segment, the first image segment being enclosed within the second image segment, and the first image segment splitting into at least two image segments.

13. The multiple video stream capture and encoding apparatus according to claim 10, wherein
the at least one segment analyzer further:
identifies a third plurality of identified image segments within a third image that is within a second plurality of images, the second plurality of images having been captured at substantially a second time that is different than the first time, the third plurality of identified image segments capturing a second at least partially common view of a second scene
identifies a fourth plurality of identified image segments within a fourth image that is within the second plurality of images; and
identifies, within the third plurality of identified image segments and within the fourth plurality of identified image segments, a second set of corresponding image segments, wherein each image segment within the second set of corresponding image segments is a respective image segment that correspond to a respective common object within the second scene, the respective image segment being present in both the third image and the fourth image; and wherein the composite graph generator further:
  creates a second graph data structure for the third image, the first data graph structure comprising a second plurality of nodes with each of the nodes in the second plurality of nodes being associated with a respective image segment within the second set of corresponding image segments; and
  specifies at least one link between a third node and a fourth node within the second plurality of nodes within the second graph data structure, each of the at least one link between the third node and the fourth node indicating a relationship between a third image segment and a fourth image segment, wherein the third image segment is associated with the third node and the fourth image segment is associated with the fourth node.

14. The multiple video stream capture and encoding apparatus of claim 13, wherein the composite graph generator stores image data for at least one of the third plurality of identified image segment and the fourth plurality of identified image segments as residual image data relative to an image within the first plurality of images.

15. The multiple video stream capture and encoding apparatus of claim 13, wherein the composite graph generator encodes image data into the second graph data as one of a P-frame and a B-frame relative to image data stored in the first graph data structure.

16. The multiple video stream capture and encoding apparatus of claim 13, wherein the composite graph generator further:
  determines a change between the first plurality of identified image segments and the third plurality of identified image segments that is greater than a threshold,
  wherein the composite graph generator encodes, in response to determining the change is greater than the threshold, image data into at least one node within the second graph data structure as an I-frame.

17. The multiple video stream capture and encoding apparatus of claim 13, wherein the composite graph generator modifies at least one of the nodes within the first graph data structure to specify at least one of a translation and a rotation observed for at least one of the identified image segments between the first time and the second time.

18. The multiple video stream capture and encoding apparatus of claim 13, wherein the composite graph generator further:
  produces a composite graph data structure storing image segment attributes and relationships for all video streams captured by multiple video cameras; and
  produces an encoded data stream, based upon the composite graph data structure, representing a plurality of video streams capturing the first a least partially common view and the second a least partially common view.

19. A computer program product comprising a computer readable storage tangibly encoded with computer readable instructions for encoding multiple view video streams, the computer readable instructions, when processed by a computer processor, comprising instructions for:
  identifying a first plurality of identified image segments within a first plurality of images, the first plurality of images having been captured at substantially a first time and capturing a first at least partially common view of a first scene, at least two of the images within the first plurality of images each comprising at least one image segment in the first set of corresponding image segments;
  creating a first graph data structure comprising a first plurality of nodes with each of the nodes in the first plurality of nodes being associated with a respective set of corresponding image segments within the at least one first set of corresponding image segments; and
  specifying at least one link between two of the nodes within the first graph data structure based upon a relationship between the two identified image segments that are associated with the two nodes within the first graph data structure.

20. The computer program product according to claim 19, further comprising instruction for:
  identifying, with the segment analyzer, a third plurality of identified image segments within a third image that is within a second plurality of images, the second plurality of images having been captured at substantially a second time that is different than the first time, the third plurality of identified image segments capturing a second at least partially common view of a second scene;
  identifying, with the segment analyzer, a fourth plurality of identified image segments within a fourth image that is within the second plurality of images;
  identifying, with the segment analyzer within the third plurality of identified image segments and within the fourth plurality of identified image segments, a second set of corresponding image segments, wherein each image segment within the second set of corresponding image segments is a respective image segment that correspond to a respective common object within the second scene, the respective image segment being present in both the third image and the fourth image;
  creating, with the graph generator, a second graph data structure for the third image, the first data graph structure comprising a second plurality of nodes with each of the nodes in the second plurality of nodes being associated with a respective image segment within the second set of corresponding image segments; and
  specifying, with the graph generator, at least one link between a third node and a fourth node within the second plurality of nodes within the second graph data structure, each of the at least one link between the third node and the fourth node indicating a relationship between a third image segment and a fourth image segment, wherein the third image segment is associated with the third node and the fourth image segment is associated with the fourth node.

21. A method for recreating multiple view video streams, the method comprising the steps of:
  recreating, with a computer system, a first plurality of images that were captured as substantially a first time by spatially expanding I-Frame multiple video stream data contained in a spatial-temporal graph data structure;
  temporally expanding, with the computer system, the spatial-temporal graph data structure from the I-Frame data corresponding to the first time to a second time based upon P-Frame data contained in the spatial-temporal graph data structure;
  recreating, with the computer system, a second plurality of images that were captured as substantially a second time by spatially expanding P-Frame multiple video stream data contained in a spatial-temporal graph data structure.

22. The method of claim 21, further comprising:
temporally expanding, with the computer system, the spatial-temporal graph data structure from the I-Frame data corresponding to the first time and the P-Frame data corresponding to the second time based upon B-Frame data contained in the spatial-temp oral graph data structure;

recreating, with the computer system, a third plurality of images that were captured as substantially a third time by spatially expanding B-Frame multiple video stream data contained in a spatial-temporal graph data structure.

* * * * *